March 30, 1943.    A. R. MAIER    2,315,157
DRAWWORKS
Filed June 14, 1941    2 Sheets-Sheet 1

Inventor:
AUGUST R. MAIER,
by: John E. Jackson
his Attorney.

March 30, 1943.  A. R. MAIER  2,315,157
DRAWWORKS
Filed June 14, 1941  2 Sheets-Sheet 2
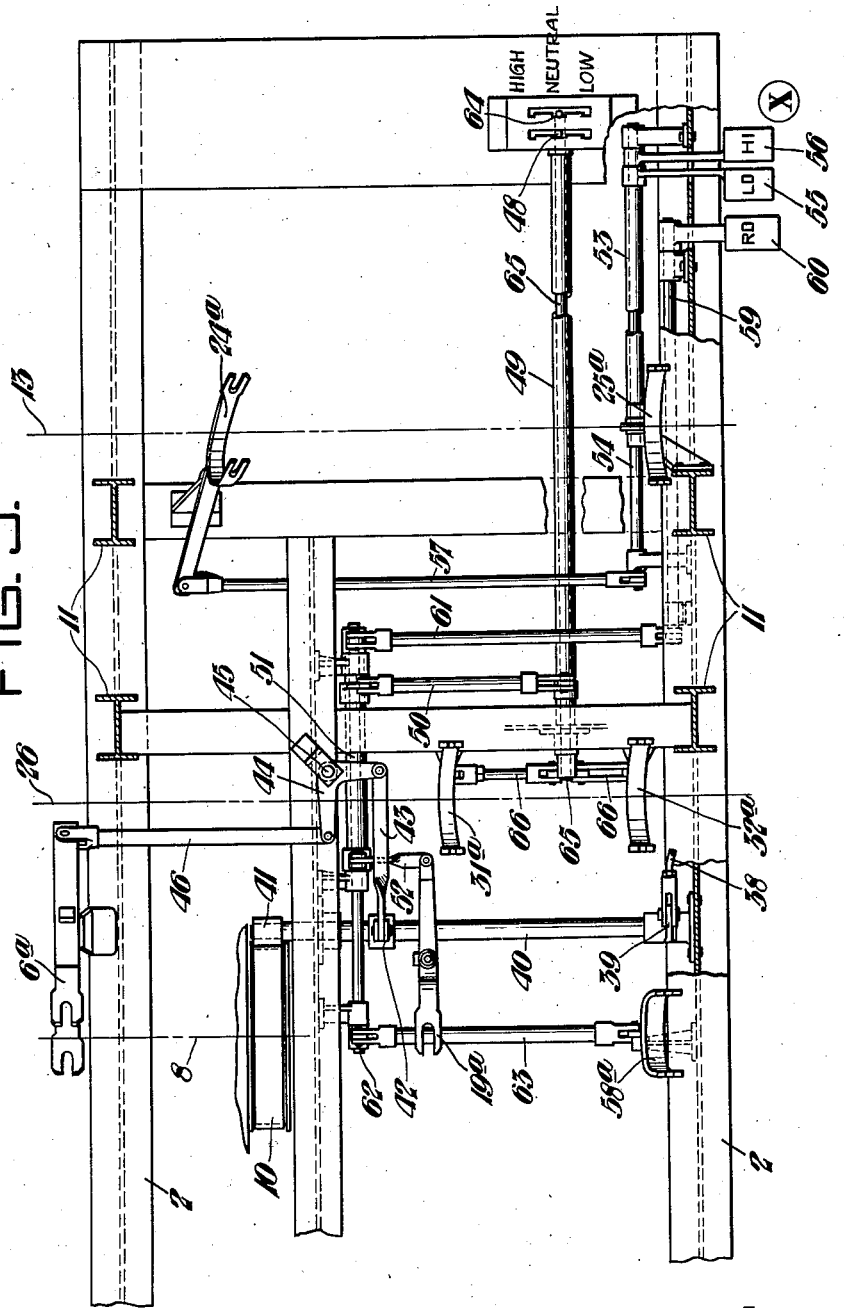
Inventor:
AUGUST R. MAIER,
by: John E. Jackson
his Attorney.

Patented Mar. 30, 1943

2,315,157

UNITED STATES PATENT OFFICE 2,315,157

DRAW WORKS

August R. Maier, Oil City, Pa., assignor to Oil Well Supply Company, a corporation of New Jersey Application June 14, 1941, Serial No. 398,163

1 Claim. (Cl. 254—187)

My invention relates to improvements in drawworks for well drilling, and more particularly to a unitary drawworks for selective power transmission for the various operations in rotary well drilling.

The drawworks has heretofore comprised an arrangement of shafting driven by a prime mover to drive a drum for hoisting purposes, and in some instances the same has been employed as an auxiliary drive for the rotary. However, in the latter case, the rotary is driven from the drum shaft, whereby the drum is inoperative for hoisting purposes. Also, in such auxiliary rotary drives, the entire drawworks including all chain drives and rotating parts except the drum must run during the operation of the rotary, thereby causing unnecessary wear on the drawworks.

This invention contemplates the provision of a unitary drawworks having additional power transmission facilities whereby the hoisting drum and the rotary may be separately driven from the same power source, and also has in view to provide additional transmission and control features to give increased flexibility of transmission for drilling operations. By means of my improved construction, it is possible to drive the rotary while the majority of the rotating parts of the drawworks remain inactive, thereby preventing the wearing thereof.

Another object is to provide a drawworks of compact unitary construction to impart maximum portability and economy of construction thereto.

Additional objects and advantages will become apparent from the following description taken in connection with the accompanying drawings, wherein:

Fig. 3 is a schematic plan view of the controls for operating the drawworks.

Figure 1:
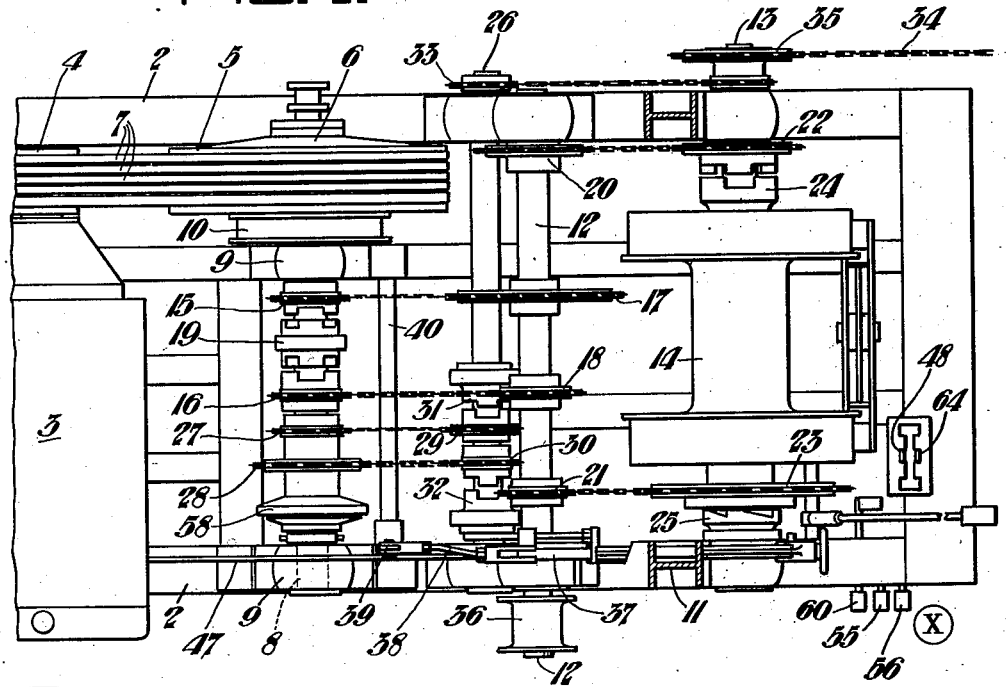
Fig. 1 is a plan view of a drawworks embodying my invention.

Referring to the drawings, 2, 2 designate skid members secured together and comprising a supporting base. At one end of said base is mounted a prime mover 3, such as an internal combustion engine or steam engine, disposed with the shaft thereof transversely of the base structure and having a pulley 4 connected to the pulley 5 of a reverse clutch 6 by means of belts 7, said clutch being mounted on and driving a transverse horizontal jack shaft 8 supported in suitable pedestal bearings 9 on the skids 2, 2.

The clutch 6 is preferably of the friction and planetary gear type, having friction engagement for one direction of rotation and employing a brake 10 securing the friction parts and permitting reverse rotation of the shaft by the planetary gears, as will be readily understood, said clutch thereby being operable to rotate the shaft 8 in either direction from a unidirectional power application by the engine.

Spaced from jack shaft 8, I provide a pair of side frames or uprights 11 mounting a transverse horizontal line shaft 12 on the side of the uprights adjacent the jack shaft, and mounting a transverse horizontal drum shaft 13 on the other side thereof, said line and drum shafts being rotatably supported in suitable bearings on the frames 11. Shaft 13 carries a drum 14 for the hoisting cable, and line shaft 12 is operatively connected with said drum and jack shafts for power transmission.

Thus, a pair of clutch-controlled sprockets 15 and 16 are rotatable on the jack shaft 8 and are chain connected with sprockets 17 and 18, respectively, on the line shaft 12. The ratios of sprockets 15, 17 and 16, 18 are such as to afford different speeds from the jack shaft to the line shaft, the driving sprockets 15 and 16 being selectively connected with the jack shaft by an intervening slidable coacting clutch member 19 rotatable with said shaft.

Line shaft 12 is provided with sprockets 20 and 21 connected by chains with sprockets 22 and 23, respectively, of the drum shaft 13, the drum shaft sprockets having clutches 24 and 25 respectively, the ratios of sprockets 20, 22 and 21, 23 providing speed changes for the drum shaft 13.

Intermediate the jack and drum shafts, and below the level of the line shaft, I provide a fourth or rotary drive shaft 26 extending transversely of the drawworks and horizontally supported in suitable bearings on the lower portions of the uprights 11. Rotary drive shaft 26 is driven from the jack shaft 8, the latter having a pair of sprockets 27 and 28 respectively connected by chains to sprockets 29 and 30 on the rotary shaft. The ratios of sprockets 27, 29 and 28, 30 provide speed changes for the rotary drive shaft 26 through clutches 31 and 32 for selective engagement with the sprockets on the latter shaft.

Sprockets 27 and 28 comprise a double sprocket loosely mounted on shaft 8, having a coacting clutch 58 for selectively connecting the dual sprocket with said shaft.

Hence, by means of an outboard sprocket 33 on one end of the shaft 26, I have provided an independent drive for a rotary (not shown) by means of a chain 34 from a double idler sprocket 35 freely rotatable on an end of the drum shaft 13, said idler 35 being connected by a chain with the rotary drive shaft sprocket 33, as shown in Fig. 1. When it is desired to operate the rotary alone, the same is readily driven at one of two selective speeds without driving the line or drum shafts, and therefore without wearing idling rotation of the numerous chain and sprocket connections therebetween and between the line and jack shafts.

Conversely, the rotary drive means may be stopped by disengaging clutch 58, and the hoisting mechanism employed for operation of the drum 14, or the rotary and drum shafts may be operated conjointly, as for example, when it is desired to use the hoist for auxiliary hoisting purposes during drilling. Also, a cathead 36 on one end of the line shaft 12 may be driven to operate a catline while the rotary is in operation.

Thus it will be seen that I have provided a drawworks unit which is capable of separately or conjointly performing the various operations attendant upon rotary well drilling, and such drawworks, together with the centralized controls therefore, provides a highly compact and efficient apparatus.

The controls for my improved drawworks are clearly illustrated in Fig. 3, wherein the shafts, sprockets, clutches and drum of the drawworks have been omitted, the shafts being indicated by their center lines only, and the various clutch clevises being given numerals corresponding to the numerals of the parts which they operate, but with the added exponent a.

All of said controls terminate adjacent the driller's position, indicated by the circle X, at one side of the unit, and include a combined throttle and reversing control 37. Said control is slidably mounted on one of the drawworks uprights 11 and is pivotally connected by linkage 38 with a vertically disposed lever 39 secured to a rock shaft 40 mounted in the base structure and extending toward the reverse clutch 6 for operative engagement with the brake 10 thereof, as indicated at 41.

Figure 2:
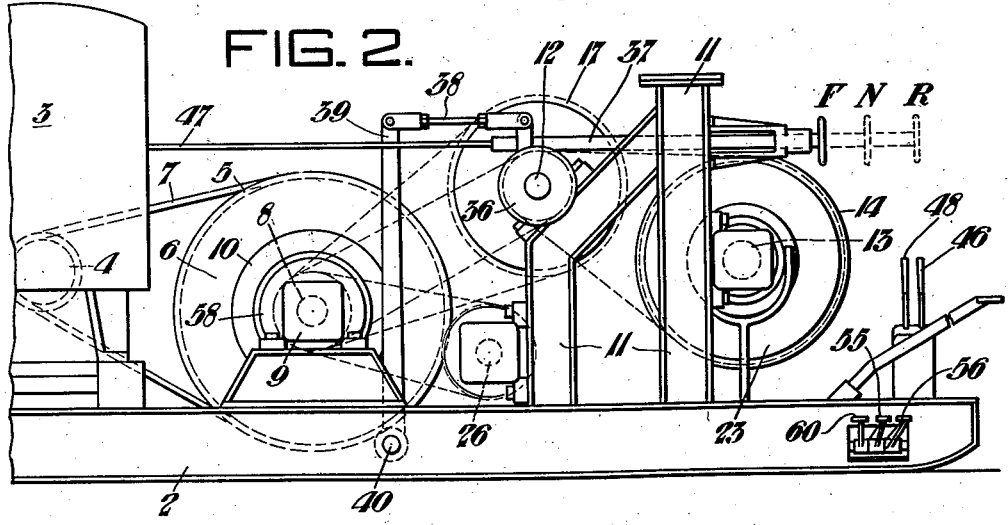
Fig. 2 is a side elevational view thereof.

Shaft 40 has a lever 42 connected by a link 43 with bell crank 44 pivoted at 45 to the base structure, the other arm of bell crank 44 being connected by a link 46 with a pivoted clevis 6ª for actuating the friction portion of the reverse clutch 6. Hence, by moving the control 37 to forward position F in Fig. 2, the friction portion of clutch 6 is engaged while the brake 10 is held inactive. In neutral position N, neither the friction means nor the brake are actuated, and in reverse position R, the friction means is released and brake 10 actuated to permit the planetary action of the reverse clutch to drive jack shaft 8 in reverse direction.

Associated with the control 37, I also provide a rod 47 extending therebeyond and connecting the carburetor or valve of the engine 3.

For the purpose of driving the hoisting drum 14 at a selected speed, I first drive the line shaft through either the sprockets 15, 17 or sprockets 16, 18, the latter being a high speed and the former a low speed drive. These drives are controlled by a shift lever 48 secured to a tubular shaft 49, said shaft being pivotally connected by a link 50 to a second tubular shaft 51, the latter having a linkage connection 52 with a clevis 19ª for connecting sprockets 15 or 16 with shaft 8 through actuation of clutch member 19.

Telescoping rock shafts 53 and 54 are provided with pedals 55 and 56 for respectively actuating a clutch clevis 25ª rotatable with shaft 53, and clutch clevis 24ª through linkage 57 connecting the latter clevis and shaft 54. In this manner, pedal 55 provides a reduced speed for the drum shaft 13 from the line shaft 12 through sprockets 21, 23, and pedal 56 provides for an increased speed through sprockets 20 and 22.

Thus, by manipulating the pedals 55 and 56 and lever 48, it is possible for the operator to obtain four speeds for the drum shaft 13, at any of which speeds the drawworks may be quickly reversed or thrown into neutral by the clutch control 37, providing a high degree of flexibility of operation of the apparatus for hoisting purposes.

In order to similarly effect quick and positive control of the rotary drive, I provide a shaft 59 operable by a pedal 60 to control the operation of the clutch 58 through connecting linkage 61, shaft 62, link 63 and clevis 58ª, thereby connecting dual sprocket 27, 28 with the jack shaft 8. A shift lever 64 is connected to a shaft 65 telescoping within shaft 49, said shaft 65 terminating in linkage connections 66 for actuating clutch clevises 31ª and 32ª, whereby the speed of the rotary drive shaft 26 may be varied by connecting either sprocket 29 or 30 with said shaft.

From the foregoing it will be seen that I have provided a compact unitary apparatus embodying all the essential power transmission facilities for rotary drilling operations. By means of my improved drawworks, the driller may conveniently and quickly control the various operations with a high degree of speed variation and prompt reversal of the rotation of the apparatus.

Various changes and modifications are contemplated within the scope of the following claim.

I claim:

In a drawworks, the combination with a supporting base, of a jack shaft transversely mounted thereon, a pair of spaced upright side frames secured to the base, a line shaft transversely mounted between said frames on the side thereof adjacent the jack shaft, a drum shaft mounted transversely between said frames on the other side thereof from said line shaft, means for driving the line shaft directly from the jack shaft including a clutch on the latter, means for driving the drum shaft from the line shaft, a rotary drive shaft mounted transversely between the side frames on the same side thereof as and beneath the line shaft, means for directly driving the rotary drive shaft at one of two different speeds from the jack shaft including a clutch driving a dual sprocket on the latter shaft, a reverse clutch on the jack shaft, a prime mover mounted transversely on the base adjacent the jack shaft and driving the latter through said reverse clutch, separate controls connecting each of said clutches mounted on the base and terminating in separate actuating means adjacent the driller's position at the drawworks, thereby providing selective, independent and reversible drives for the drum and rotary drive shafts from the jack shaft.

AUGUST R. MAIER.